Oct. 12, 1926.  1,602,492
D. JAMES ET AL
WHEEL FOR TRACTORS AND CERTAIN FARMING IMPLEMENTS
Filed Oct. 8, 1923   2 Sheets-Sheet 1
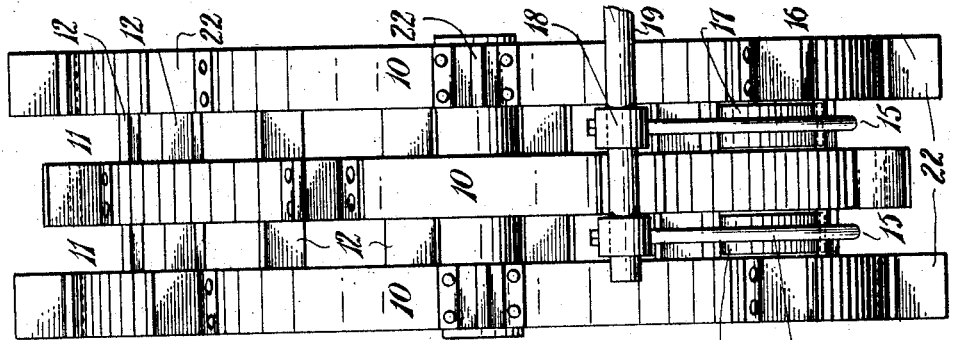
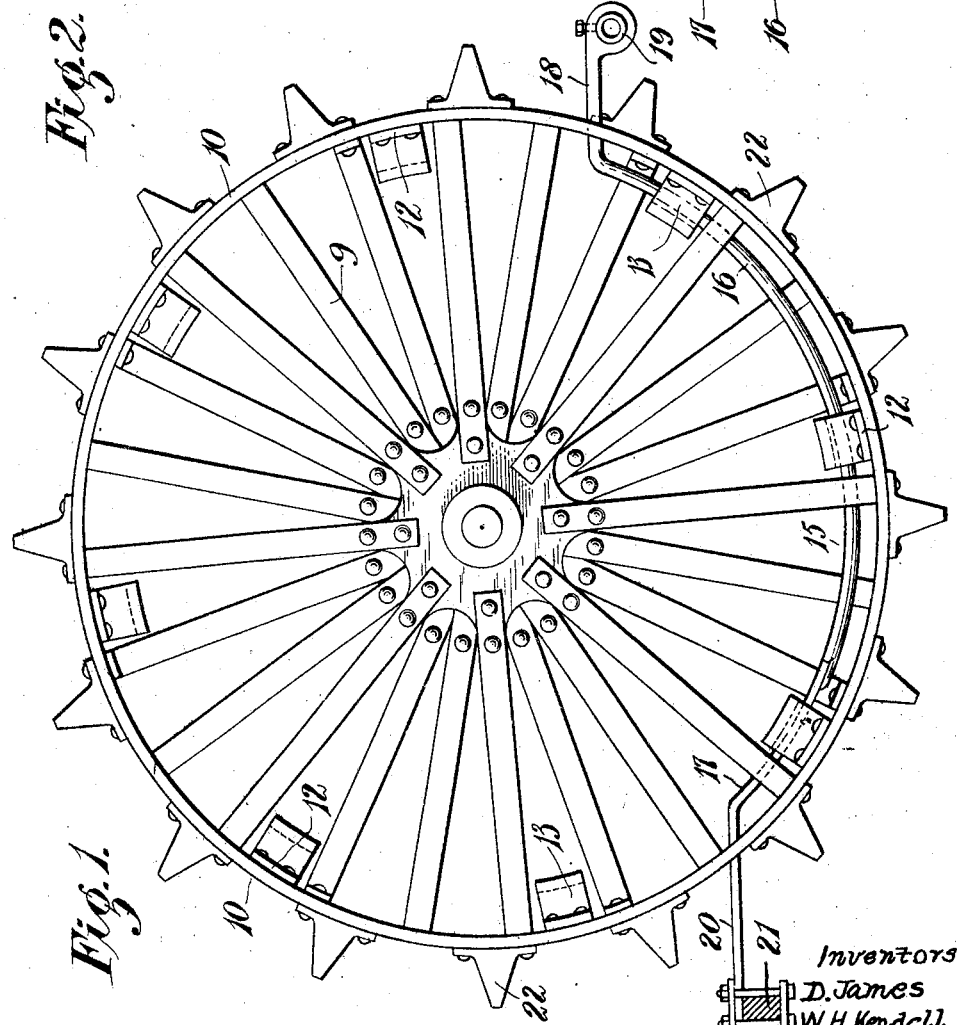
Inventors:
D. James
W. H. Kendell
By John O. Seifert
Atty.

Oct. 12, 1926.
D. JAMES ET AL
1,602,492
WHEEL FOR TRACTORS AND CERTAIN FARMING IMPLEMENTS
Filed Oct. 8, 1923   2 Sheets-Sheet 2
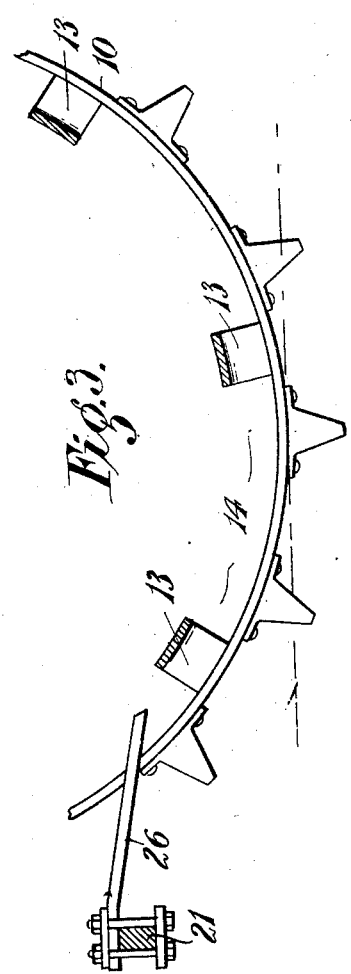
Inventors:
D. James
W. H. Kendell Patented Oct. 12, 1926.

1,602,492

UNITED STATES PATENT OFFICE.

DANIEL JAMES, OF ESSENDON, AND WILLIAM H. KENDELL, OF LUBECK, VICTORIA, AUSTRALIA.

WHEEL FOR TRACTORS AND CERTAIN FARMING IMPLEMENTS.

Application filed October 8, 1923, Serial No. 667,105, and in Australia May 29, 1923.

This invention relates to improvements in and connected with wheels of tractors and certain farm implements such as cultivators, combined seed drills and cultivators and the like, but is directed more particularly to the wheels of farm tractors.

The primary object of the invention is to provide improvements in and relating to the wheels of farm tractors whereby the machines can be operated satisfactorily even under adverse climatic conditions such as exist in wet seasons or after heavy rain when the soil is rendered very soft and is of adhesive character.

A further object is to provide a wheel having an effective surface grip, and having means whereby the wheel tread will be automatically freed of soil adhering thereto whilst the machine is at work, and the wheel tread is maintained in a relatively clean condition although operating in moist and adhesive soils.

A still further object is to provide an improved wheel construction associated with a cleaning or scraper attachment for farm tractors whereby greatly improved seed-bed conditions will be obtained. This result is obtained by eliminating that damage to a field surface which is now occasioned by the operation of tractors in wet seasons or after rain, when wheel track depressions are made in the field and soil, which adhered to the wheels, is compressed into said depressions under the weight of the machine.

With these and other objects in view the invention consists of the features of construction, combination and arrangement hereinafter fully described, reference being had to the accompanying drawings, wherein:—

Figure 1 is a view in side elevation of a tractor wheel representative of the invention, and having applied thereto cleaning or scraper attachments of preferred form.

Figure 2 is an end elevation of the wheel and its associated cleaning or scraper attachments seen in Figure 1.

Figure 3 is a view in side elevation illustrating the use with the improved wheel of cleaning or scraper devices of alternative design.

Figure 4 is a diagrammatic view illustrative of the wheel track effect produced in a cultivated field by existing types of wheels when a tractor has been operating in soft soil.

Figure 5 is a diagrammatic view showing the improved seed-bed conditions obtained by the use of tractor wheels and wheel attachments according to the invention.

In these views, 9 designates a wheel of a farm-tractor having its rim or tyre composed of a plurality of annular elements 10 of corresponding diameter and arranged in parallel relationship.

The rim elements are in the form of annular bands constructed from flat metal, and in the preferred construction as illustrated in the drawings there are employed three of said annular metallic bands, each of which is approximately four inches in width, while each of the intervening clearance spaces 11 is of approximately three inches in width, thereby providing a wheel having a rim width of approximately eighteen inches.

The rim elements 10 are secured together at the required distances apart by means of a series of transversely disposed connecting bars 12, which function as distance pieces.

The connecting bars 12 are constructed of wrought or cast metal (preferably steel), and each is formed with two U-shaped members 13 having a width corresponding to that of said clearance spaces 11, with which they register when fitted to the rim elements.

The metal connecting bars 12 are rigidly secured to the interior surfaces of the flat metal rim elements by means of rivets or other approved fastenings, and they are of such number and spaced equidistantly to provide effective bracing and reinforcement whereby the wheel will have the requisite degree of durability.

The spaces 11 between the rim elements 10 and the spaces 14 between the transverse connecting bars 12 provide ample clearance for the free passage of soil which is initially broken and then removed from the exterior rim surface by the action of cleaning or scraper devices operating in the manner hereinafter described.

The depth of said U-shaped members 13 formed on the transverse connecting bars 12 is such as will permit of free action therein between the rim elements 10 of a cleaning or scraper device and without metal to metal contact of the rim elements and scraper device such as would produce undue friction.

These cleaning or scraper devices are preferably as illustrated in Figures 1 and 2, wherein 15 designates metal rods of segmental design mounted stationarily one in each of the clearance spaces 11. Each cleaning or scraper device has a portion 16 which is of round section and a rear flat member 17 of greater width, but nevertheless of less width than that of the clearance space 11 so as to avoid possibility of contact with either of the opposing edges of the rim elements 10 or with the opposing surfaces of said U-shaped members 13.

The forward end portion of each of the cleaning or scraper devices 15 has an extension 18 which is secured to a rod or arm 19 affixed to the chassis and extending transversely in advance of the wheel, while the rear end portion of each of said cleaning or scraper devices has an extension 20 that is affixed to a transverse bar or rod 21 supported from a rear part of the chassis and disposed rearwardly of the wheel.

The rear ends of said cleaning or scraper devices are preferably arranged closer to the ground level than are the forward ends of said devices—see Figure 1.

It will be understood that said cleaning or scraper attachments could extend completely around the wheel, if so desired.

Each rim element 10 is provided with tread grip devices 22 which are preferably of the well-known "spade" type, and the grips on the intermediate rim element are positioned midway between the corresponding grips secured to the outer and inner rim elements.

In the operation under dry weather conditions of a tractor equipped with wheels as described, the combined widths of the rim elements 10 provide adequate surface grip and the wheels by reason of the series of transverse connecting bars 12—functioning as braces—will be found to be rigid and durable. When the tractor is working in wet, soft and adhesive soil, (conditions which obtain in wet seasons and following heavy rainfall), the advantages of our improvements are made apparent. Slippage of the wheels is avoided while the soil which adheres to the rim in the form of a false tyre is initially broken centrally of the clearance spaces 11 by the forward portions of the stationary cleaning or scraper devices 15. The continued movement of the wheel about said cleaning or scraper devices causes the flat rearward portions 17 thereof to further break the adhering soil at points adjacent to the edges of said clearance spaces, and simultaneously disintegrate the soil which passes through the clearance spaces 11 and 14 and over the edges of said rim elements 10.

The breakage of the false rim or tyre of adhering soil by the cleaning or scraper devices 15, acting between the rim elements 10 interiorly of the wheel perimeter, in the manner described results in the loosening of the soil carried by the rim elements themselves, and the exterior surfaces thereof are maintained relatively clean, even when the tractor is working under most adverse conditions for power haulage of farming implements or machinery.

The ordinary field effect of a tractor working in wet adhesive soil is depicted by the diagrammatic view Figure 4. Depressions as A corresponding to the width of the wheel rims are initially formed in the field, and false tyres of soil that adhere to the wheels are compressed under the weight of the tractor, into such depressions thereby forming an upper and relatively hard layer $a$ of soil in each of said wheel depressions. To obtain a seed-bed for satisfactory crop production under these conditions, it becomes necessary to scarify the soil to a depth below the compression soil layers $a$ in the wheel depressions, or alternatively to sow the grain at a depth below said layers $a$ which frequently is too deep for the obtainment of desired cultivation results.

The field effect of a tractor working in wet and adhesive soil, but equipped with wheels each having a plurality of spaced rim elements and associated cleaning or scraper devices arranged and functioning as hereinbefore explained, is illustrated by the diagrammatic view Figure 5. The elements of the rim initially form depressions B, but the soil that is removed from the rim automatically and is disintegrated by the cleaning or scraper devices during the travel of the tractor is deposited loosely into and about said depressions, being indicated by $b$, and satisfactory seed-bed conditions are ensured.

For use with a sectionally constructed and braced wheel for a tractor, as hereinbefore described, the cleaning or scraper devices operating interiorly of the wheel perimeter may be of flexible character, as is shown by Figures 3 and 4, wherein 23 designates a chain having its opposite ends pivotally attached to rods 24 and 25 which are carried by said rods or bars 19 and 21 that extend transversely in advance of and rearwardly of the wheel, respectively. Said chain is accommodated within the U-shaped members 13 formed on the transverse bars 13 rigidly connecting the rim elements 10.

Wheel cleaning or scraper devices 26, fitted exteriorly of the wheel but having their operating ends arranged interiorly of the wheel perimeter (see Figure 3), may be employed, and these are detachably clamped to the transverse bar or rod 21 arranged rearwardly of the wheel, said cleaning or scraper devices having their operative ends projecting into the clearance spaces 11.

Although our improvements are directed specially to wheels of farm tractors, it will be understood that the same may be applied to the wheels of certain farming implements such as cultivators and combined grain drills and cultivators, whose satisfactory operation in wet and adhesive soils is to a material degree dependent upon the maintenance of the wheels in a relatively clean condition by automatic removal of adhering soil without necessitating stoppage of cultivating operations for the purpose.

The term "tractor" in the appended claims is, therefore, to be understood to embrace wheels of cultivating implements of the character indicated.

What we do claim is:—

1. In a wheel for tractors, rim elements arranged in concentric and axially spaced relation, and fixedly supported means engaging in the space between and extending transversely of the wheel in the direction of travel thereof and located below the axis of and within the perimeter of said rim elements, said means being operative through the rotation of the wheel to release soil from the wheel which is picked up by the wheel during the rotation thereof and deposit the same substantially in the same place from where it was picked up.

2. In a wheel for tractors, wheel elements having the periphery arranged in a horizontal plane, rigid bars disposed transversely of and connecting the rim elements in concentric spaced relation, and a rigid bar arranged in the space between and intersecting the rim elements and interposed between the axis of the wheel and the ground for the purposes specified.

3. In a wheel for tractors, a plurality of annular rim elements arranged in parallel spaced relation and rigidly connected by a series of transverse spacing bars formed with inwardly extending U shaped portions arranged in line with the spaces between the rim elements, and a cleaning member of curved shape to conform with the curvature of the periphery of the annular rim elements adapted to be fixedly supported at the opposite ends exteriorly of the wheel perimeter and arranged within the space between the rim elements and said U shaped portions of the bars to intersect substantially a quarter section of the wheels.

4. In a wheel for tractors according to claim 4, wherein the wheel cleaning member consists of a bar having a portion of round cross-section to constitute the front end and a portion of rectangular cross-section to constitute the rear end of said member.

In testimony whereof we affix our signatures.

DANIEL JAMES.
WILLIAM H. KENDELL.